United States Patent
Zhang et al.

(10) Patent No.: US 9,733,401 B2
(45) Date of Patent: Aug. 15, 2017

(54) LED DISPLAY SYSTEM

(71) Applicant: LEYARD OPTOELECTRONIC CO., LTD., Beijing (CN)

(72) Inventors: Longhu Zhang, Beijing (CN); Changjun Lu, Beijing (CN); Tong Pan, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 128 days.

(21) Appl. No.: 14/759,435

(22) PCT Filed: Sep. 25, 2013

(86) PCT No.: PCT/CN2013/084216
§ 371 (c)(1),
(2) Date: Jul. 7, 2015

(87) PCT Pub. No.: WO2014/139278
PCT Pub. Date: Sep. 18, 2014

(65) Prior Publication Data
US 2015/0355391 A1    Dec. 10, 2015

(30) Foreign Application Priority Data

Mar. 14, 2013  (CN) .......................... 2013 1 0081771
Mar. 14, 2013  (CN) .......................... 2013 1 0081813
Mar. 14, 2013  (CN) .......................... 2013 1 0081814

(51) Int. Cl.
*G02B 5/02*    (2006.01)
*G02B 27/22*   (2006.01)
(Continued)

(52) U.S. Cl.
CPC ............. *G02B 5/0294* (2013.01); *G02B 5/02* (2013.01); *G02B 5/0205* (2013.01);
(Continued)

(58) Field of Classification Search
CPC .... G02B 27/2214; G02B 27/225; G02B 5/02; G02B 5/0205; G02B 5/0294;
(Continued)

(56) References Cited

U.S. PATENT DOCUMENTS 6,496,236 B1 * 12/2002 Cole ................. G02F 1/133615
                                                    345/102
6,631,575 B1   10/2003 Voelzke et al.
(Continued)

FOREIGN PATENT DOCUMENTS

CN         2775785 Y    4/2006
CN       201021954 Y    2/2008
(Continued)

OTHER PUBLICATIONS

English abstract of CN203118361U, published Aug. 7, 2013.
(Continued)

*Primary Examiner* — Peggy Neils
(74) *Attorney, Agent, or Firm* — Porter Wright Morris & Arthur LLP

(57) ABSTRACT

An LED display device includes an LED display panel (1); and an encasing, arranged on one side of the LED display panel (1). The encasing includes a plurality of diffuser units (10); each diffuser unit (10) is adhered to the LED display panel (1); and, a locating structure is arranged between the diffuser unit (10) and the LED display panel (1) so as to limit an adhesion position of the diffuser unit (10) on the LED display panel (1). The LED display device has a small splicing gap and a better display effect.

11 Claims, 3 Drawing Sheets

(51) Int. Cl.
*F21Y 105/10* (2016.01)
*F21Y 115/10* (2016.01)

(52) U.S. Cl.
CPC ....... *G02B 27/225* (2013.01); *G02B 27/2214* (2013.01); *F21Y 2105/10* (2016.08); *F21Y 2115/10* (2016.08)

(58) Field of Classification Search
CPC ....... G02B 6/0016; G02B 6/0068; F21K 9/61; F21Y 2101/00; F21Y 2105/10; F21Y 2115/10
See application file for complete search history.

(56) References Cited

U.S. PATENT DOCUMENTS

| | | | | |
|---|---|---|---|---|
| 7,186,014 | B2 * | 3/2007 | Shimura | G02B 6/0063 349/65 |
| 7,607,799 | B2 * | 10/2009 | Ohkawa | G02B 3/0056 362/237 |
| 7,762,706 | B2 * | 7/2010 | Okuwaki | G02B 6/0051 362/619 |
| 8,313,206 | B2 * | 11/2012 | Ing | G02F 1/133608 362/800 |
| 8,681,289 | B2 * | 3/2014 | Takahashi | F21V 7/0066 349/61 |
| 2009/0141208 | A1 * | 6/2009 | Byoun | G02F 1/133606 349/58 |
| 2010/0214514 | A1 * | 8/2010 | Lin | G02F 1/133606 349/112 |
| 2012/0218753 | A1 * | 8/2012 | Joffer | G09F 23/0066 362/235 |
| 2013/0039031 | A1 * | 2/2013 | Asano | G02B 5/0242 362/19 |

FOREIGN PATENT DOCUMENTS

| | | |
|---|---|---|
| CN | 201097160 Y | 8/2008 |
| CN | 201226215 Y | 4/2009 |
| CN | 101476700 A | 7/2009 |
| CN | 101615093 A | 12/2009 |
| CN | 201584129 U | 9/2010 |
| CN | 201927295 U | 8/2011 |
| CN | 201936556 U | 8/2011 |
| CN | 201945751 U | 8/2011 |
| CN | 102238409 A | 11/2011 |
| CN | 102290006 A | 12/2011 |
| CN | 102411403 A | 4/2012 |
| CN | 202647583 U | 1/2013 |
| CN | 202794718 U | 3/2013 |
| CN | 203118361 U | 8/2013 |
| CN | 203118362 U | 8/2013 |
| CN | 203134291 U | 8/2013 |
| JP | 06266298 A | 9/1994 |
| JP | 2001085748 A | 3/2001 |
| JP | 2009258455 A | 11/2009 |
| JP | 2011204371 A | 10/2011 |

OTHER PUBLICATIONS

English abstract of CN203118362U, published Aug. 7, 2013.
English abstract of CN203134291U, published Aug. 14, 2013.
English abstract of CN201226215Y, published Apr. 22, 2009.
English abstract of CN102290006A, published Dec. 21, 2011.
English abstract of JP2001085748A, published Mar. 30, 2001.
English abstract of CN101476700A, published Jul. 8, 2009.
English abstract of CN201945751U, published Aug. 24, 2011.
English abstract of CN102411403A, published Apr. 11, 2012.
English abstract of JP2009258455A, published Nov. 5, 2009.
Search Report for EP13877558, Aug. 25, 2016.
English Abstract for CN102238409A, published Nov. 9, 2011.
English Abstract for CN201021954Y, published Feb. 13, 2008.
English Abstract for CN202794718U, published Mar. 13, 2013.
English Abstract for JP2011204371A, published Oct. 13, 2011.
English Abstract for CN201936556U, published Aug. 17, 2011.
English Abstract for CN201584129U, published Sep. 15, 2010.
English Abstract for CN201927295U, published Aug. 10, 2011.
English Abstract for CN201097160Y, published Aug. 6, 2008.
English Abstract for CN101615093A, published Dec. 30, 2009.
English Abstract for JP06266298A, published Sep. 22, 1994.
English Abstract for CN202647583U, published Jan. 2, 2013.
English Abstract for CN2775785Y, published Apr. 26, 2006.

* cited by examiner

LED DISPLAY SYSTEM

TECHNICAL FIELD OF THE DISCLOSURE

The disclosure relates to the technical field of Light-Emitting Diode (LED) display, in particular to an LED display device.

BACKGROUND OF THE DISCLOSURE

In the prior art, an LED display screen consists of LED lamps. It will appear grainy when the LED display screen displays, and in addition, a moire pattern will appear due to the phenomenon of grainy during photographing. The problems are solved by adding a semitransparent glass or semi-transparent plastic plate outside the LED display screen in the prior art, but this method has defects as follows:

1. In consideration of reasons such as transportation, a size of the glass or plastic plate is limited so as to further cause the problem that the display screen cannot be infinitely but only be limited to a certain size. Splicing is required in case of excess of a certain size, and glass or plastic plates need to be fixed by frames after being spliced, that is, there is a frame in a circumferential direction of each glass or plastic plate. Therefore, it will appear an obvious splicing gap and the phenomenon of obvious splicing gap like a television wall, and further influence a display effect.

2. The glass or plastic plates are difficult to be fixed, which may cause a difference between distances with an LED lamp plane, thereby causing the inconsistency of the display effect and influence on the display effect.

SUMMARY OF THE DISCLOSURE

A purpose of the disclosure is to provide an LED display device with a small splicing gap.

In order to achieve the purpose, the disclosure provides an LED display device, including: an LED display panel; and an encasing, arranged on one side of the LED display panel, wherein the encasing includes a plurality of diffuser units; each diffuser unit is adhered to the LED display panel; and, a locating structure is arranged between the diffuser unit and the LED display panel so as to limit an adhesion position of the diffuser unit on the LED display panel.

Further, there is a plurality of LED display panels, and a plurality of diffuser units are adhered to each of the LED display panels.

Further, each diffuser unit is provided with a first side towards the LED display panel and a second side away from the LED display panel; the second side is a plane and provided with a one-way translucent membrane; and the one-way translucent membrane transmits light along a direction from the first side to the second side.

Further, the one-way light transmittance of each one-way translucent membrane is over 60 percent.

Further, the diffuser unit is made from glass or plastics.

Further, receiving blind holes adapted to LED lamps in shape are formed in positions corresponding to the LED lamps of the LED display panel on the diffuser unit.

Further, protrusions are arranged at positions corresponding to the LED lamps of the LED display panel on the diffuser unit, and the protrusion is provided with a central blind hole to form the receiving blind hole, and a first groove is formed between every two adjacent protrusions.

Further, a groove depth of the first groove is smaller than a hole depth of the receiving bind hole.

Further, the locating structure includes: at least two locating holes, provided in the LED display panel, and locating convex columns, provided on the corresponding diffuser unit and matched with each locating hole in a one-to-one correspondence way.

Further, the LED display panel includes a lamp panel and an LED lamp arranged on the lamp panel, and the diffuser unit is adhered to the lamp panel or the LED lamps.

By the technical solution of the disclosure, the encasing includes the a plurality of diffuser units, each diffuser unit is adhered to the LED display panel, and in such a way, the diffuser units are not required to be fixed by a frame, so that a splicing gap is effectively reduced. Moreover, the locating structure is arranged between the diffuser unit and the LED display panel to limit the adhesion position of each diffuser unit on the LED display panel. By the locating of the locating structure, the position where the diffuser unit connects to the LED display panel will be more accurate, and further contributes to reducing the splicing gap. The technical solution of the disclosure facilitates to reduce, the splicing gap effectively.

BRIEF DESCRIPTION OF THE DRAWINGS

The drawings forming a part of the disclosure are described here to provide further understanding of the disclosure. The schematic embodiments and description of the disclosure are adopted to explain the disclosure, and do not form improper limits to the disclosure. In the drawings.

Figure 1:
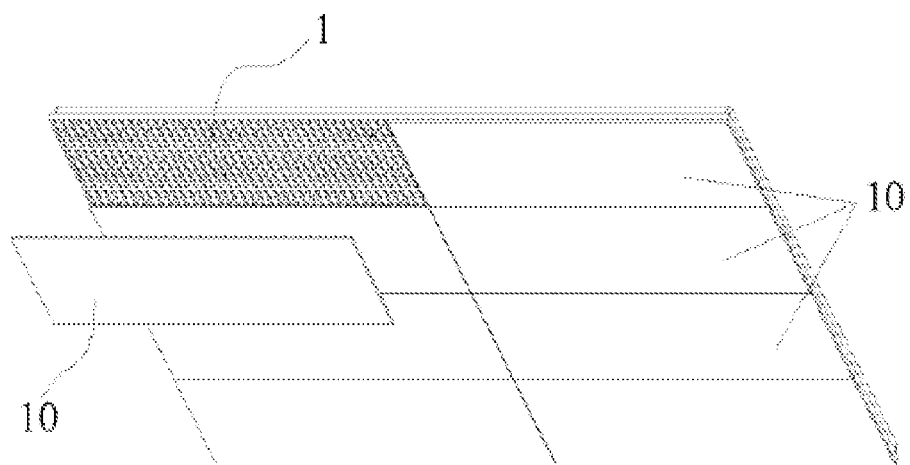
FIG. 1 is a local structure view of an embodiment 1 of an LED display device according to the disclosure.

The drawings include drawing reference numerals as follows:

1. LED display panel; 10. diffuser unit; 11. first side; 12. second side; 13. receiving blind hole; 14. protrusion; 15. first groove; 16. locating convex column; and 17. second groove.

DETAILED DESCRIPTION OF THE EMBODIMENTS

It should be noted that the embodiments of the disclosure and the characteristics in the embodiments can be combined under the condition of no conflicts. The disclosure is descried below with reference to the drawings and embodiments in detail.

As shown in FIG. 1, an LED display device according to an embodiment 1 includes an LED display panel 1 and an encasing. The encasing is arranged on one side of the LED display panel 1, and the encasing includes a plurality of diffuser units 10, wherein each diffuser unit 10 is adhered to the LED display panel 1, and a locating structure is arranged between each diffuser unit 10 and the LED display panel 1 to limit an adhesion position of the diffuser unit 10 on the LED display panel 1. By the locating of the locating structure, the connection position where the diffuser unit connects to the LED display panel is more accurately, and further contributes to reducing a splicing gap.

The LED display panel 1 includes a lamp panel and a LED lamp arranged on the lamp panel, and the diffuser unit 10 is adhered to the lamp panel or the LED lamp. As shown in FIG. 1, in the embodiment 1, the plurality of diffuser units 10 of the encasing have the same structure, and are arranged on the LED display panel 1 in a matrix. Certainly, as a feasible implementation mode, the plurality of diffuser units 10 of the encasing can also have different structures.

Preferably, in the embodiment 1, there is a plurality of LED display panels 1, and a plurality of diffuser units 10 are adhered to each of the LED display panels 1. Therefore, in comparison to the technical solution that a plurality of LED display panels correspond to one glass or plastic plate in the prior art, a size of each diffuser unit 10 is greatly reduced. Thus, the diffuser unit 10 is not required to be fixed by a frame any longer, so that the splicing gap is effectively reduced. On the other hand, the reduced size of each diffuser unit 10 can effectively solve the problem of machinability, thereby improving the machining accuracy of the diffuser unit 10. The smaller the size of the diffuser unit 10, the higher the shape accuracy and the consistency. Therefore, differences after splicing will be smaller, and the gaps will be closer, and it can be controlled within a range without influence on a display effect, and display requirements can be met. It should be noted that, FIG. 1 only shows one LED display panel of the LED display device in the embodiment 1 and a plurality of diffuser units 10 correspondingly connected therewith.

Figure 2:
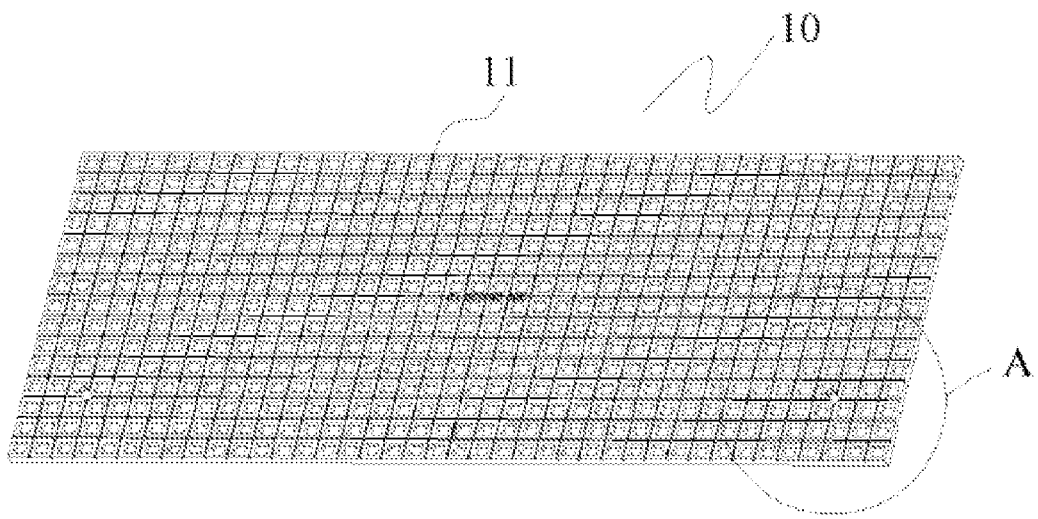
FIG. 2 is a view of a first side of a diffuser unit of an encasing of the LED display device in FIG. 1.
Figure 3:
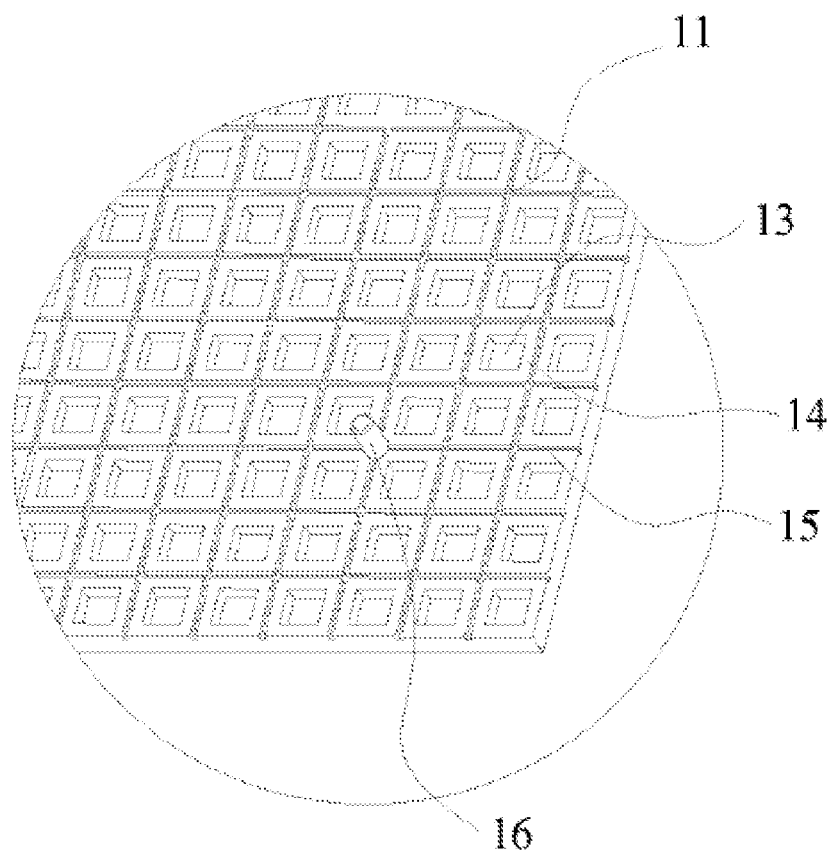
FIG. 3 is an enlarged view of part A of the diffuser unit in FIG. 2.
Figure 4:
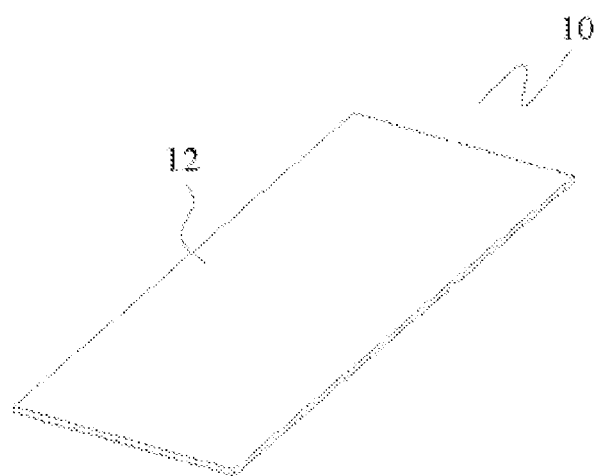
FIG. 4 is a view of a second side of the diffuser unit in FIG. 2.

As shown in FIG. 2 to FIG. 4, each diffuser unit 10 is provided with a first side 11 towards the LED display panel 1 and a second side 12 away from the LED display panel 1, wherein the second side 12 is a plane; and a one-way translucent membrane is arranged on the second side 12, and the one-way translucent membrane transmits the light along a direction from the first side 11 to the second side 12. In such a way, when the LED lamp is not turned on, an observer cannot see the LED display panel from the second side, and only when the LED lamp is turned on, the observer can see content displayed on the LED display panel. Therefore, the grainy is effectively eliminated, and a visual experience of the observer is effectively improved.

The one-way translucent membrane can be implemented by coating on a surface of the second side of the diffuser unit, and in order to achieve a better display effect, the one-way translucent membrane with one-way light transmittance over 60 percent is preferably adopted. A material for the diffuser unit is required to be transparent plastics, preferably glass or plastics. In order to improve the display effect and prevent the light of the LED lamp from laterally leaking, as shown in FIG. 3, in the embodiment 1, receiving blind holes 13 adapted to the LED lamps in shape are formed in positions, corresponding to the LED lamps of the LED display panel 1, on the diffuser unit 10 to further form a luminous light cup. At the same time, the receiving blind hole 13 can also play a good role in locating when the diffuser unit 10 is adhered to the LED display panel 1, and the accurately locating will further reduce the splicing gap.

As shown in FIG. 3, in the embodiment 1, a protrusion 14 is arranged at position corresponding to the LED lamp of the LED display panel 1 on the diffuser unit 10, and the protrusion 14 is provided with a central blind hole to form the receiving blind hole 13. A one-to-one correspondence between the receiving blind holes 13 and each of the LED lamps facilitates the flatness and consistency of the encasing. In order to strengthen the strength of the diffuser unit, a first groove 15 is formed between every two adjacent protrusions 14. Preferably, a groove depth of the first groove 15 is smaller than a hole depth of the receiving blind hole 13.

There are several implementation modes for the locating structure for locating between the diffuser unit 10 and the LED display panel 1, and as shown in FIG. 3, in the embodiment 1, the locating structure includes a locating hole and a locating convex column 16, which are matched with each other, the number of the locating holes of the locating structure is at least two, the locating holes are formed in the LED display panel 1, the number of the locating convex columns 16 of the locating structure is preferably the same as that of the locating holes, and the locating convex columns 16 are arranged on the diffuser unit 10.

In the prior art, along with the development of the display screen market, a mirror display screen is applied in the field of advertisement display and the like. The mirror display screen in the prior art usually adopts a mirror liquid crystal plasma display screen, and a mirror effect is achieved by adding a coated glass or plastic plate outside the display screen. However, besides the defects mentioned in the background, such a structure has defects as follows:

1. Due to a strength requirement, the larger the size of the glass or plastic plate, the greater the thickness, therefore the weight is greater.

2. Due to the large size, it is difficult to ensure the flatness, and is easy to sink inwards or protrude outwards, thereby causing a distorting mirror effect.

The LED display device (not shown in the Figs) according to an embodiment 2 of the disclosure effectively solves the problems above, and a difference between the LED display device in the embodiment 2 and the above embodiment is the structure of the second side. In the embodiment 2, each diffuser unit is provided with a first side towards the LED display panel and a second side away from the LED display panel, and the second side is a plane and provided with a semitransparent mirror membrane. Due to adhesion connection, the flatness and consistency of the whole encasing are further easily ensured. When the LED lamp is not turned on, an observer cannot see the LED display panel from the second side, and a mirror effect is achieved on a surface of the encasing; and when the LED lamp is turned on, the observer can see the content displayed on the LED display panel. Therefore, the grainy is effectively eliminated, and the visual experience of the observer is effectively improved. The technical solution in the embodiment 2 makes the LED display device with a small splicing gap and higher flatness, and prevents the phenomenon of sinking inwards or protruding outwards.

In the prior art, along with the development of the display screen market, a autostereoscopic 3D display device is applied in the field of advertisement display and the like. In the prior art, it is implemented by adding the glass or plastic plate outside the display screen and adhering a grating membrane on the glass and plastic plate. However, besides the defects mentioned in the background, such a structure has a defect as follows:

Due to the strength requirement, the larger the size of the glass or plastic plate, the greater the thickness, therefore the weight is greater.

Figure 5:
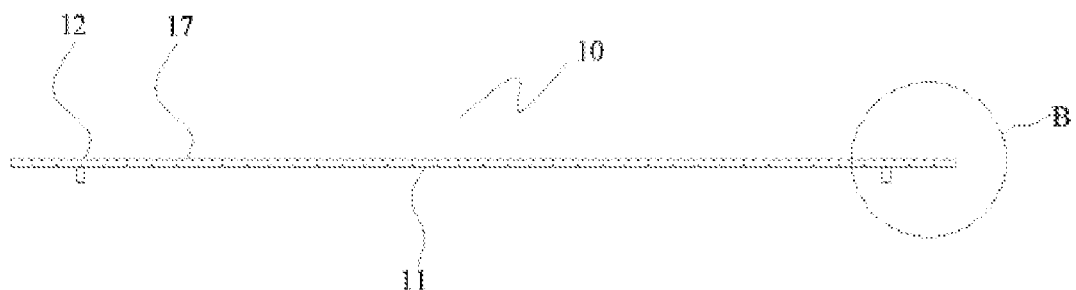
FIG. 5 is an upward view of a diffuser unit in embodiment 3 of an LED display device according to the disclosure.
Figure 6:
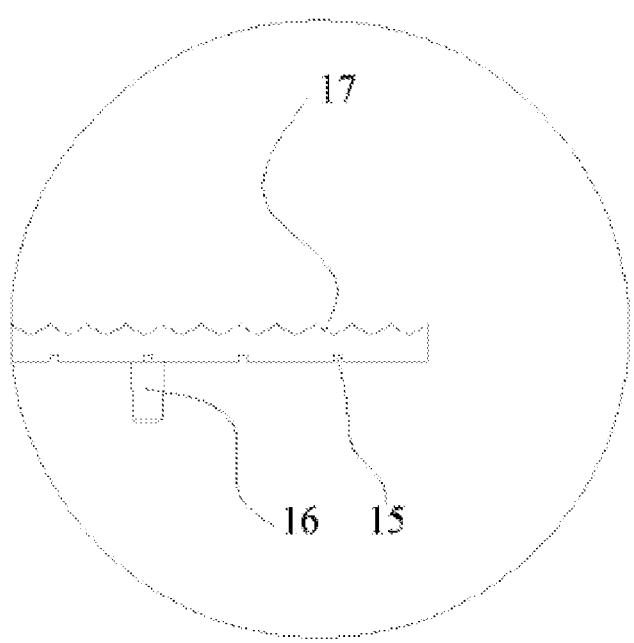
FIG. 6 is an enlarged view of part B of the diffuser unit in FIG. 5.

The LED display device according to an embodiment 3 of the disclosure effectively solves the problems, and a difference between the LED display devices in the embodiment 3 and the above embodiments is the structure of the second side. Each diffuser unit 10 is provided with a first side 11 towards the LED display panel 1 and a second side 12 away from the LED display panel 1, and as shown in FIG. 5 and FIG. 6, a grating structure is arranged on the second side 12, so that an autostereoscopic 3D effect can be achieved. In addition, due to adhesion connection, the flatness and consistency of the whole encasing are further easily ensured. The technical solution in the embodiment 3 makes the LED display device with a small splicing gap and higher flatness.

As shown in FIG. 5 and FIG. 6, a plurality of parallel second grooves 17 are formed on the second side 12 to form the grating structure. Preferably, as shown in FIG. 6, in order to improve the display effect, a cross section of the second groove 17 is V-shaped.

The above is only the preferred embodiment of the disclosure and not intended to limit the disclosure. For those skilled in the art, the disclosure can have various modifications and variations. Any modifications, equivalent replacements, improvements and the like within the spirit and principle of the disclosure shall fall within the scope of protection of the disclosure.

What is claimed is:

1. An LED display device, comprising:
    a plurality of LED display panels (1), each having an encasing arranged on one side of the LED display panel (1), wherein each of the encasings comprises a plurality of diffuser units (10) adhered to the LED display panel (1), with a locating structure arranged between each diffuser unit (10) and the LED display panel (1) so as to limit an adhesion position of the diffuser units (10) on the LED display panels (1);
    wherein each diffuser unit (10) has a first side (11) facing towards the LED display panel (1) to which the diffuser unit (10) is adhered, and a second side (12) facing away from the LED display panel; and
    further wherein the second side (12) of each diffuser unit (10) is planar and has one of:
        a one-way translucent membrane that transmits light along a direction from the first side (11) to the second side (12),
        a semitransparent mirror membrane, or
        a grating structure arranged on the second side (12).

2. The LED display device according to claim 1, wherein the second side (12) of each diffuser unit (10) has a one-way translucent membrane and the one-way light transmittance of each one-way translucent membrane is over 60 percent.

3. The LED display device according to claim 1, wherein the diffuser units (10) are made from glass or plastics.

4. The LED display device according to claim 1, wherein receiving blind holes (13) adapted to LED lamps in shape are formed in positions corresponding to the LED lamps of the LED display panels (1) on the diffuser units (10).

5. The LED display device according to claim 4, wherein protrusions (14) are arranged at positions corresponding to the LED lamps of the LED display panels (1) on the diffuser units (10), and each protrusion (14) is provided with a central blind hole to form the receiving blind hole (13), and a first groove (15) is formed between every two adjacent protrusions (14).

6. The LED display device according to claim 5, wherein a groove depth of the first grooves (15) is smaller than a hole depth of the receiving bind holes (13).

7. The LED display device according to claim 1, wherein the locating structure comprises:
    locating convex columns (16), provided on each of the diffuser units (10) and arranged to match with locating holes provided in the LED display panels, in a one-to-one correspondence way.

8. The LED display device according to claim 1, wherein each of the LED display panels comprises a lamp panel and an LED lamp arranged on the lamp panel, and each of the diffuser units (10) is adhered to the lamp panel or the LED lamps of an LED display panel.

9. The LED display device according to claim 1, wherein each diffuser unit (10) has a grating structure arranged on the second side (12) thereof, the grating structure formed by a plurality of parallel second grooves (17) provided in the second side (12).

10. The LED display device according to claim 9, wherein a cross section of each of the second grooves (17) is V-shaped.

11. The LED display device according to claim 1, wherein the second side (12) of each diffuser unit (10) has a semitransparent mirror membrane.

* * * * *

UNITED STATES PATENT AND TRADEMARK OFFICE
CERTIFICATE OF CORRECTION

| | |
|---|---|
| PATENT NO. | : 9,733,401 B2 |
| APPLICATION NO. | : 14/759435 |
| DATED | : August 15, 2017 |
| INVENTOR(S) | : Zhang et al. |

It is certified that error appears in the above-identified patent and that said Letters Patent is hereby corrected as shown below:

In the Claims

Claim 3, Column 6, Line 4, change "plastics" to --plastic--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*